United States Patent Office 2,890,945
Patented June 16, 1959

2,890,945

PROCESS OF MANUFACTURING BRIQUETTES

Heinrich Dohmen, Deventer, Netherlands, assignor to N. V. Briko, The Hague, Netherlands, a limited-liability company of the Netherlands No Drawing. Application April 18, 1955
Serial No. 502,219

Claims priority, application Netherlands April 26, 1954

5 Claims. (Cl. 44—25)

In the U.S. Patent No. 2,841,478 a process has been described of manufacturing briquettes in which the starting material is moistened with a conversion product which has been prepared by treating one or more higher carbohydrates or carbohydrate ethers with a dilute aqueous solution of an organic carboxylic acid, the thus treated material is molded under the application of pressure and the briquettes thus obtained are dried, if desired, under heating.

It now has been found that at least as good results are obtained when the carbohydrate or carbohydrate ether in finely divided dry condition is mixed with a concentrated liquid organic acid, e.g. 80% acetic acid, and thereupon is heated, a finely divided solid final product being formed at the chosen weight ratio of the carbohydrate or carbohydrate ether, which product immediately or after previous cooling may be added to the coal. The above-mentioned weight ratio may vary within wide limits, but very good results are obtained with a ratio of 5 to 10 parts by weight of carbohydrate (or carbohydrate ether) to 1 part by weight of the concentrated organic acid. Instead of the concentrated aqueous acid the organic acid may also be brought in contact with the carbohydrate or its ether in gaseous form.

If, e.g., the acid is added to the carbohydrate under continuous stirring and, after at least a part of the acid has been added, the mixture is gradually heated until a temperature of approximately 120–200° C. has been reached, a product is obtained which immediately, that is to say in dry condition, may be added to coal dust. It is desirable that the coal dust has a moisture content lying at the upper limit of the proportions mentioned in the U.S. Patent No. 2,841,478, namely, approximately 10%. The optimum moisture content is namely strongly dependent on the kind of coal used, so that often a lower moisture content is also sufficient, whilst great care is to be paid to the mixing of the powder with the coal, since the powder evidently lacks the fluidity of an aqueous solution.

For the sake of completeness it is remarked that it has already been pointed out in the U.S. Patent No. 2,835,610 that conversion products obtained by treating carbohydrates and/or carbohydrate ethers in dilute organic acid solution may be brought into dry condition by evaporation, preferably under the exclusion of air. The present application, however, is concerned with products which are prepared by treating the same starting material in dry condition with a concentrated organic acid or gaseous organic acid, whilst during at least a part of the treatment temperatures may be used higher than the boiling point of water. These products remain in the dry solid condition during the entire treatment.

Dependent on the degree of heating the conversion of the carbohydrate or carbohydrate ether may be continued more or less far.

At slight heating, e.g., a final product may be formed which has been converted to a slight extent only and has the same color as the starting material; when heating to a higher temperature discoloration may occur, when using potato starch this discoloration only occurs far over 100° C., namely at 150–200° C., but when using Tylose discoloration already occurs at approximately 100° C.; when heating continuously at a high temperature the starting material is converted into a tough emulsion-like mass, and finally a very tough product results. At this point the fluidity may be increased by the addition of a small quantity of water.

It has also been found that the dry products prepared in the above-described manner by treating a carbohydrate or a carbohydrate ether, with a concentrated organic acid may advantageously be combined with an artificial resin treated in an analogous manner. The resin may be treated, however, with a larger quantity of the concentrated organic acid; per 1 part by weight of artificial resin, e.g. ¼ part by weight to the ten-fold of 80% acetic acid may be used. The powdery artificial resin and the acetic acid are gradually mixed with each other under gentle heating, e.g. up to 60° C. and after completion of the mixing, the conversion product of the carbohydrate or the carbohydrate ether and the conversion product of the artificial resin are either mixed with each other in dry condition and added to the coal dust in dry condition, or are dispersed under heating in an excess of water or an aqueous liquid, e.g. at the boiling point of the dispersion and thereupon contacted with the coal dust. In the latter case it is preferable that the coal dust be dried to a higher extent than when the mixture of the conversion products is mixed therewith in dry condition.

As an example of an artificial resin which may be used for the process described, polyvinyl acetate may be mentioned; in general, however, all artificial resins may be used which by the treatment with a concentrated liquid or gaseous organic acid are converted in the above-mentioned manner to a product which may be dispersed or dissolved in an aqueous medium, or to a product which by the application of heat and/or pressure gives a favorable result for the purpose to be achieved.

It is advantageous to add a slight quantity of a water-repellent product, such as solid paraffin wax or kernel oil to the conversion product.

The invention is elucidated by the following examples:

*Example 1*

20 kg. of potato starch were gradually mixed with 2.7 kg. of 80% acetic acid and the mixture was thereupon heated to approximately 175° C. 2 kg. of polyvinyl acetate were also mixed with 2.5 kg. of 80% acetic acid and heated to approximately 60° C. Both conversion products were mixed well, whereupon 0.6 kg. of solid paraffin wax were added.

This mixture was added to 1000 kg. of coal dust and mixed therewith with extreme care. The degree of moisture of the coal dust was 11%. After mixing with the conversion products the temperature of the coal was increased to 90° C. by steam injection. The briquettes were pressed in warm condition in a press of usual construction and thereupon dried at the air. They were hard within a few hours and resistant against storing in the open air in any kind of weather and they satisfied the requirement of the falling test. They burned substantially without smoke and did not disintegrate during burning.

*Example 2*

The same process was followed as in Example 1, but per ton of coal dust a conversion product was started from containing per 10 kg. of potato starch treated with 1.7 kg. of 80% acetic acid and 1 kg. of polyvinyl acetate treated with 1.25 kg. of 80% acetic acid, 0.3 kg. of solid paraffin wax. This mixture was dispersed in 100 liters of water and thereupon intimately mixed with the fourteen-fold weight of coal dust having a moisture content of 4%. The temperature of the coal dust and the further treatment were substantially like those of Example 1.

The formed briquettes are hard after a few hours, do not disintegrate in water and stand a fall from a height of 1 m. without breaking. They burn without smoke and do not disintegrate during burning.

*Example 3*

15 kg. of potato starch were gradually mixed in dry condition with 2 kg. of 80% acetic acid and the mixture was thereupon heated to approximately 180° C. Also 2 kg. of polyvinyl acetate were gradually mixed in dry condition with 2.5 kg. of 80% acetic acid and heated to 60° C.

Both conversion products were dissolved at boiling temperature in 100 liters of water, whereupon 0.3 kg. of solid paraffin wax were added which were incorporated in the dispersed mixture.

A quantity of coal dust of such a weight that the weight of the above-described dispersion amounted to 7% of that of the coal was previously heated to approximately 50° C.; the dust was substantially dry; to this coal dust the above-described dispersion was added and intimately mixed therewith. The mixture was heated to approximately 90° C. by steam injection and thereupon pressed in warm condition in a briquettes press of usual construction. The briquettes were dried at the air and were hard within a short time. They could be put into water without disadvantages and were sufficiently firm to stand a fall from a height of 1 m., they burned without giving off smoke and remained intact during burning.

What is claimed is:
1. A process of manufacturing briquettes which comprises intimately mixing comminuted coal with a pulverulent conversion product prepared by reacting starch in finely divided dry state with acetic acid, heating the resulting mixture, molding the heated material into briquette form by the application of pressure, and drying the resulting briquettes.

2. A process of manufacturing briquettes which comprises preparing a pulverulent conversion product by reacting starch in finely divided dry state with acetic acid, mixing said pulverulent conversion product with at most 25% by weight, based on the weight of said conversion product, of polyvinyl acetate which has previously been heated in admixture with from ¼ to 10 times its weight of acetic acid at a temperature up to 60° C., intimately mixing comminuted coal with said mixture, heating the resulting mixture, molding the heated mixture into briquette form by the application of pressure, and drying the resultant briquettes.

3. A process according to claim 1 wherein the quantity by weight of starch is from five to ten times the quantity by weight of the acid employed.

4. A process according to claim 1 wherein said acetic acid is employed at a concentration of 80%.

5. A process according to claim 2 wherein the pulverulent conversion product is prepared by reacting the starch in a finely divided dry state with at most 20 parts by weight, calculated as $CH_3COOH$, of 80% acetic acid per 100 parts by weight of starch.

References Cited in the file of this patent

UNITED STATES PATENTS

| | | |
|---|---|---|
| 1,851,689 | Wolf | Mar. 29, 1932 |
| 2,458,191 | Nichols et al. | Jan. 4, 1949 |
| 2,808,381 | Stone | Oct. 1, 1957 |

FOREIGN PATENTS

| | | |
|---|---|---|
| 594,575 | Great Britain | Nov. 14, 1947 |

OTHER REFERENCES

"Adhesion and Adhesives," De Bruyne-Houwink (1951) Amsterdam-Elsevier Pub. Co., pages 189 and 235.